UNITED STATES PATENT OFFICE.

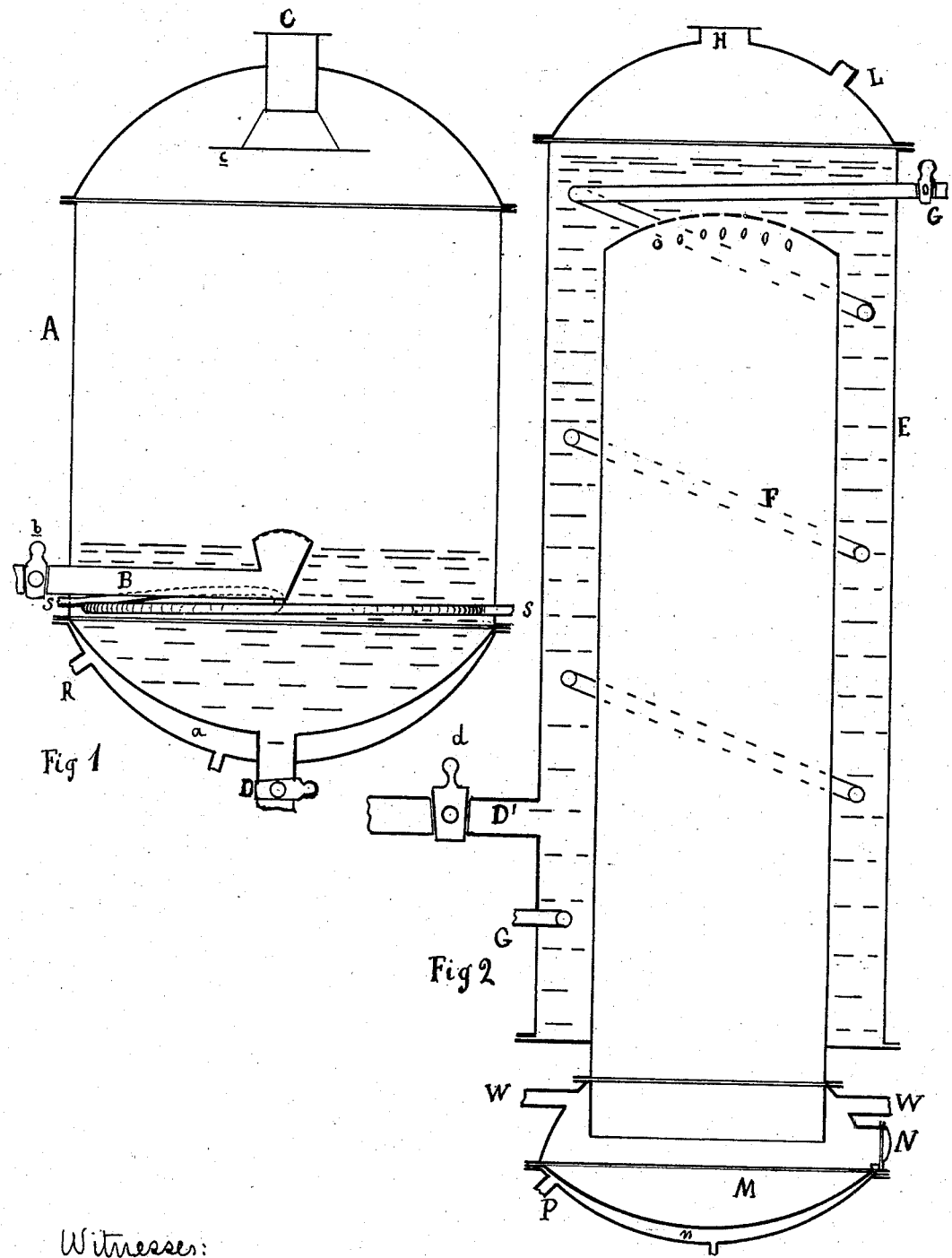

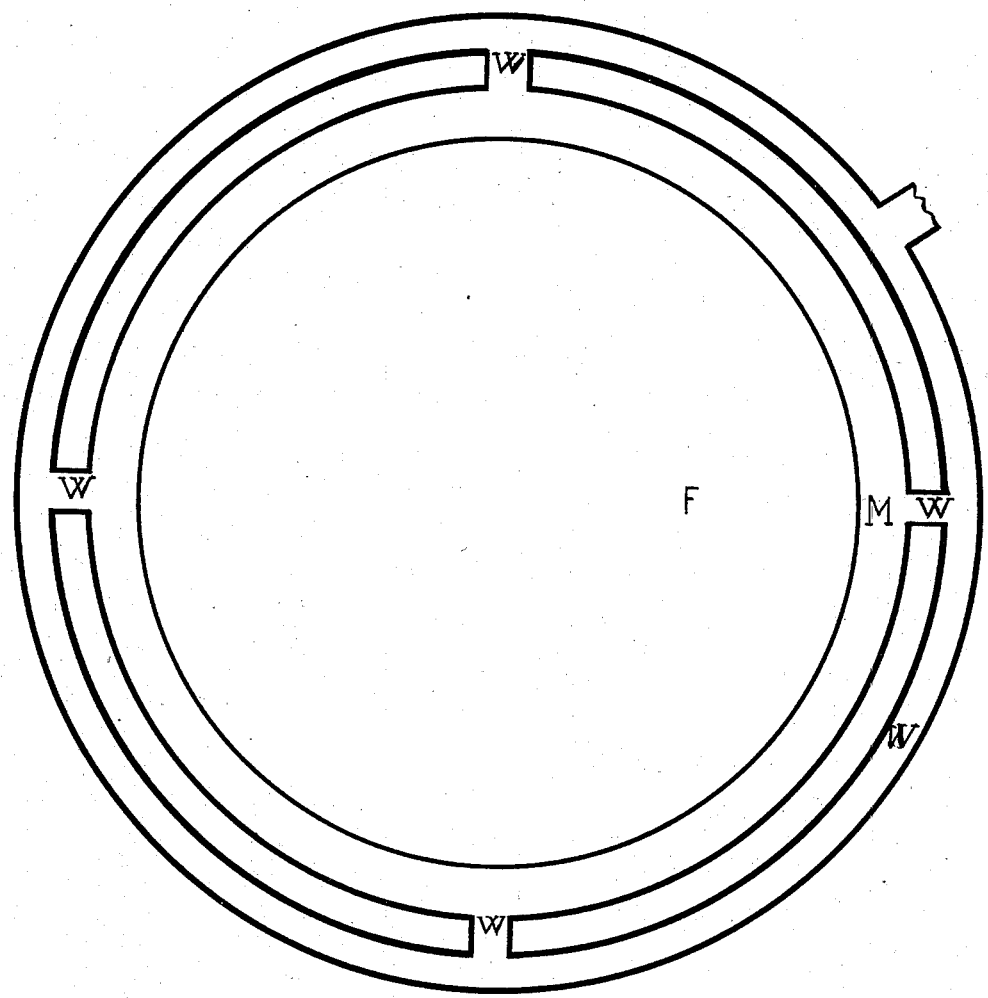

JEAN A. MATHIEU, OF PORT LEYDEN, NEW YORK.

PROCESS OF AND APPARATUS FOR EVAPORATING LIQUIDS.

SPECIFICATION forming part of Letters Patent No. 268,701, dated December 5, 1882.

Application filed March 21, 1882. (No model.)

*To all whom it may concern:*

Be it known that I, JEAN A. MATHIEU, of Port Leyden, in the county of Lewis and State of New York, have invented a new and useful Improvement in Process of and Apparatus for Separating Non-Volatile Substances from Volatile Substances, of which the following is a specification.

Figure 1 is a vertical section through a boiling-kettle. Fig. 2 is a vertical section through a drying apparatus. Fig. 3 is a horizontal section on the line of pipe W, Fig. 2.

My invention relates to a process of and apparatus for the manufacture of acetate of lime; and it consists, first, in an apparatus for separating non-volatile from volatile substances, consisting of a tank for heating the mixture, a heated vessel communicating with the heating-tank, and having the point of communication covered with a plate perforated with fine holes, and mechanism for maintaining a partial or entire vacuum in the said vessel; second, in forcing the mixture to be separated in a heated and finely-divided state into a heated vessel in which a partial or entire vacuum is maintaned.

A is a boiling-kettle, having a double bottom, *a*, in which steam can be forced through a pipe, R, for the purpose of keeping the bottom of the kettle hot, having an inlet and outlet pipe connected therewith.

S is a coil of steam-pipes in kettle A.

B is an inlet-pipe, having therein a stopcock, *b*, to regulate the flow of the mixture of acetic acid and lime through pipe B. I prefer to turn up the inner end of pipe B, and provide the same with a rose, so that the liquid passing through said pipe will be delivered into kettle A in a series of fine streams.

C is a pipe opening into the top of kettle A, and connected with an air pump or fan, by which the air can be partially or wholly exhausted in kettle A.

*c* is a plate covering the inner end of pipe C, the opening from the interior of kettle A into pipe C being above said plate *c*.

D is a pipe by which the liquid in kettle A can be drawn off.

E is a metal tank, having at the top thereof an opening, H, provided with a damper by which the same can be wholly or partially closed at will.

G is a steam-pipe coiled around the interior of tank E.

F is a pipe or column, of less diameter than tank E, rising nearly to the top of said tank and passing below the bottom thereof, being fastened with a tight joint to the bottom of said tank. The upper end of pipe F is closed by a plate perforated with small holes *o*. The lower end of pipe F is open, and is set into a metallic vessel, M, the top of said vessel being soldered or otherwise tightly fastened to the outside of pipe F. Vessel M has a double bottom, *n*, into which steam may be admitted through pipe P to keep the bottom thereof warm.

N is a door by which access may be had to vessel M.

W is a circular pipe connected all around or at intervals with the interior of vessel M and leading to the air-pump.

D' is a pipe connected with pipe D, Fig. 1, and having therein a valve by which the flow of liquid through pipe D' can be regulated.

L is a steam-pipe through which steam may be admitted at will to the interior of tank E.

The operation of my invention is as follows: A mixture of acetic acid and lime is admitted through the pipe B to kettle A, in which it is heated by steam passing through steam-coil S. The air-pump attached to pipe C creates a partial vacuum in kettle A, by which the temperature at which the acetic acid and lime will boil is greatly reduced, and at the same time a large portion of the water contained in the acetic acid and lime is carried off in the shape of steam through pipe C. On opening valve *d* into pipe D' the liquid contained in kettle A flows through pipe D D' into tank E, where it is heated by steam passing through pipe G. The liquid is kept in tank E, standing above the top of pipe F. When the air-pump to which pip W is attached is at work a partial vacuum is created in vessel M and pipe F, and the liquid in tank E is drawn into pipe F through the small holes *o*, falling through the length of said pipe. The water contained in the heated liquid, owing to the reduction of pressure in said pipe F, caused by the partial vacuum, flashes into steam and liberates the solid matters held in solution in said water. The steam passes down pipe F, and is thrown off through pipe W and discharged outside the apparatus, while the acetate of lime held in solution in such water falls in the shape of powder on the bottom of vessel M, whence it may be removed through door N. Opening H in the top of tank E is left more or less open, as is necessary to supply air to the tank E. Steam is admitted through pipe L, if for any reason the liquid in tank E becomes too thick to flow freely through holes o.

It is obvious that the principle of my invention is applicable to all cases in which it is desired to separate liquid from any solid matters held in solution therein.

What I claim as my invention, and desire to secure by Letters Patent, is—

1. The kettle A, pipe B, having a rose thereon, steam-pipe S, and exhaust-pipe C, substantially as shown and described.

2. The combination of a tank, E, having steam-pipe G, pipe F, metallic vessel M, and door N, and exhaust-pipe W, all constructed, arranged, and operating substantially as herein shown and described.

3. The herein-described process of separating solid matters from any fluid holding the same in solution, consisting in subjecting the same in a heated and finely-divided state to the action of a partial or entire vacuum.

JEAN A. MATHIEU.

Witnesses:
GEORGE H. CARLISLE,
GEO. H. LOTHROP.